Nov. 15, 1938.   H. L. MITCHELL   2,136,860
SELF-LUBRICATING STUFFING BOX
Filed Dec. 28, 1937   2 Sheets-Sheet 1
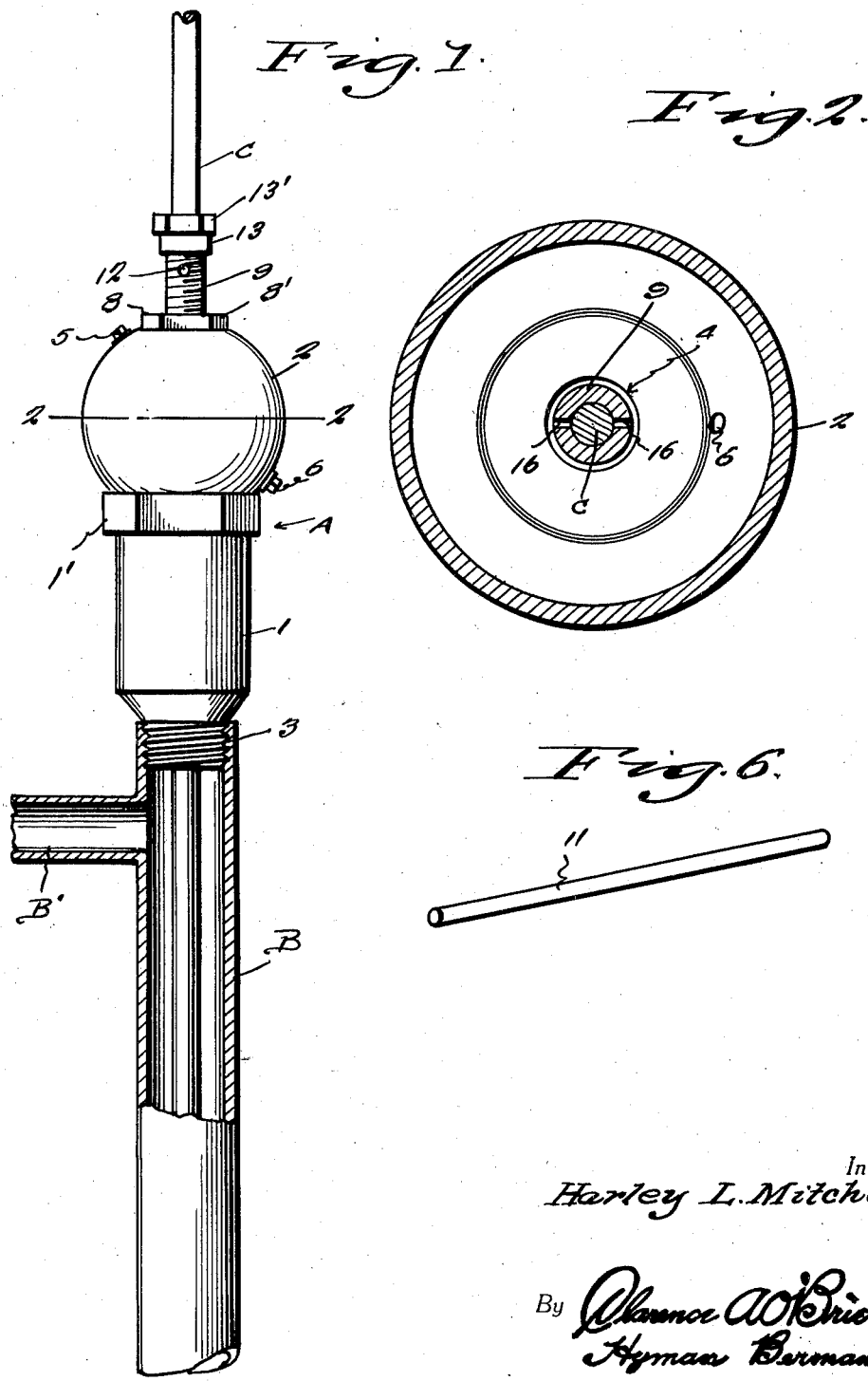
Inventor
Harley L. Mitchell
By Clarence A. O'Brien
Hyman Berman
Attorneys

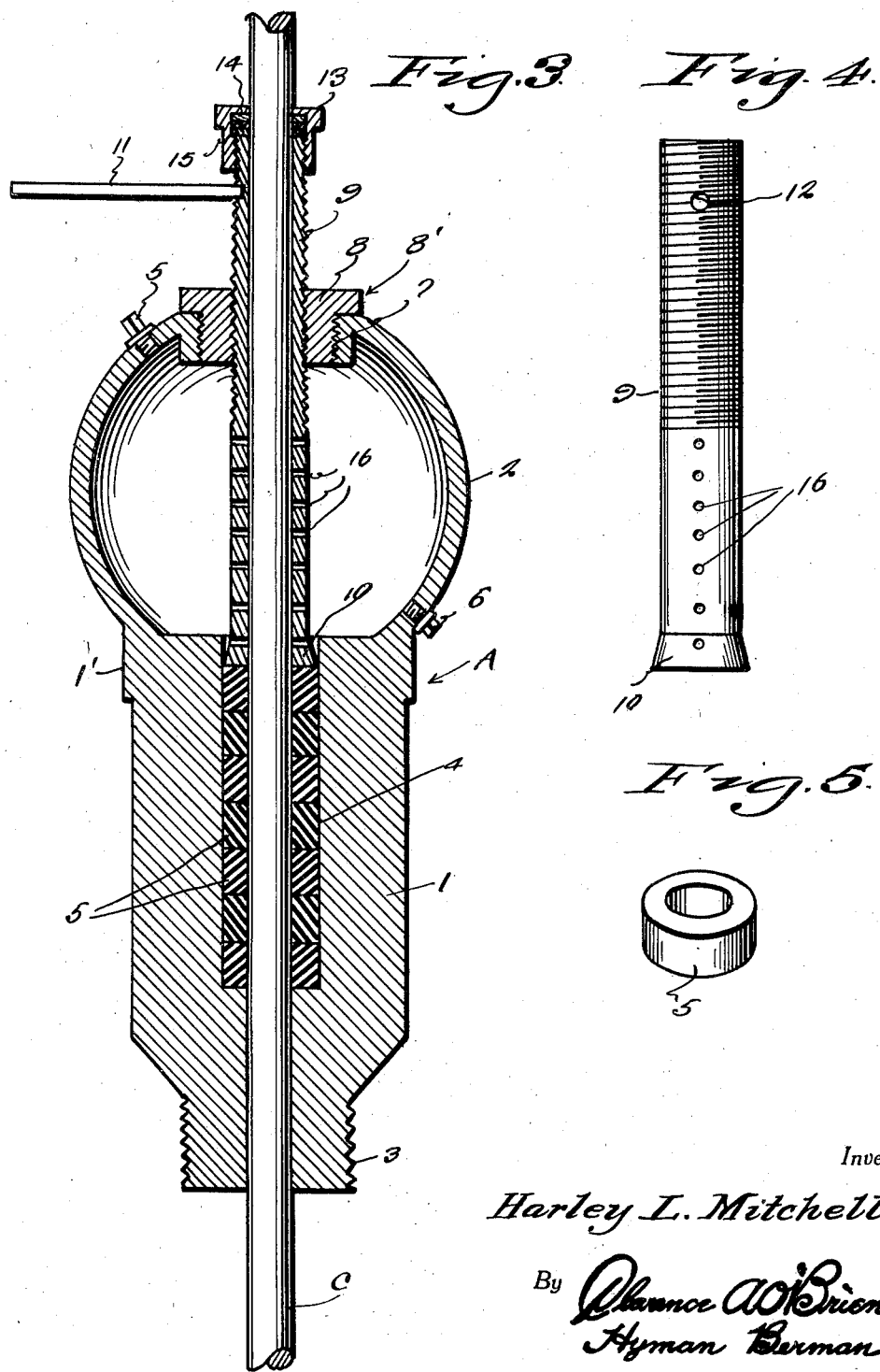

Patented Nov. 15, 1938

2,136,860

UNITED STATES PATENT OFFICE 2,136,860

SELF-LUBRICATING STUFFING BOX

Harley Leonard Mitchell, Olney, Tex., assignor of one-half to Ray N. Horany, Olney, Tex.

Application December 28, 1937, Serial No. 182,099

1 Claim. (Cl. 286—35)

This invention relates to a self-lubricating stuffing box for the polish rod of oil and other types of well, the general object of the invention being to provide a body having a lower part formed with a bore for receiving the rubbers and an upper portion forming an oil or lubricant receiving reservoir having an opening in its top through which the rubbers can be passed into the bore, a plug for closing the opening, a tubular member passing through a threaded hole in the plug and having its lower end engaging the top rubber for applying pressure to the rubbers, said tubular member having perforations in that part which is located in the reservoir so the lubricant can reach the rod, as well as the rubbers, with a packing gland at the upper end of the tubular member. Thus the rod and the rubbers are thoroughly lubricated and there is no danger of the fluid from the well escaping through the box.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation of the invention attached to the upper end of the flow pipe of a well with parts of the pipe section.

Figure 2 is a section on the line 2—2 of Figure 1.

Figure 3 is a longitudinal sectional view through the device with the rod in elevation.

Figure 4 is a view of the perforated and tubular member.

Figure 5 is a view of one of the rubbers.

Figure 6 is a view of the rod which forms a handle for turning the tubular member.

In these drawings the letter A indicates the body of the box which is formed of the lower substantially cylindrical part 1 and the upper reservoir forming part 2, this part 2 being preferably of globe shape. The lower end of the part 1 is reduced and threaded as shown at 3 for fitting in the upper end of the flow pipe B, as shown in Figure 1, this pipe having the branch B' extending to the tanks which receive the oil. Of course, the polish rod C passes through the box and the bore of the part 1 through which the rod passes is formed with an enlarged part 4 for receiving the rubbers 5, one of which is shown in Figure 5.

The upper end of the part 4 opens out into the bottom of the reservoir 2 and said reservoir can be filled with lubricant through an upper opening closed by a plug 5 and this lubricant can be drained from the reservoir through a lower opening closed by a plug 6. The upper end of the reservoir is provided with a large opening 7 closed by a threaded plug 8 and said plug has a threaded opening therein through which the threaded portion of the tubular member 9 passes. This member 9 is of considerable length and has an enlarged lower end 10 which engages the upper rubber and acts to hold the rubbers under pressure and this pressure can be regulated by turning the tubular member 9 by means of a rod 11 having one end engaging a hole 12 in the upper end of the tubular member. Of course, by turning the tubular member its threading connection with the plug 8 will cause that member to move downwardly or upwardly, in accordance with the direction of rotation and thus the amount of pressure the tubular member places on the rubbers can be regulated. Of course, the rod C passes through this tubular member and a gland cap 13 which contains an upper washer 14 of felt or the like and lower washers 15 of rubber or the like. Thus a packing gland is provided at the upper end of the member 9 for the rod C.

That part of the member 9 within the reservoir is formed with the perforations 16 for permitting the lubricant in the reservoir to reach the rod C.

The upper end of the part 1 of the box is formed with a wrench receiving part 1' so that the box can be turned by a wrench to cause it to engage the upper end of the pipe B or to release it from said pipe and the upper end of the plug 8 is also formed with a wrench receiving part 8'. The upper end of the cap is also formed with a wrench receiving part 13'.

Thus it will be seen that the polish rod and the rubbers are thoroughly lubricated by the lubricant in the reservoir 2 and the rubbers can be introduced through the opening 7 after the plug 8 is removed. The gland composed of the cap 13 and the washers 14 and 15 will prevent the escape of oil from the upper end of the tubular member 9 and as the rubbers are thoroughly lubricated and held under pressure by the lower end of the member 9 there will be no escape of oil past these rubbers and they will last for a long time as there is no danger of the rubbers being burned out by friction from the movement of the polish rod. The device will need but little attention aside from keeping the reservoir filled with lubricant. As the device keeps the polish rod lubricated at all times there is no danger of the rod becoming rusted or pitted. As the body of the device is made of one piece of material leakage of oil is eliminated and the device can be manufactured to sell at low cost.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:—

A stuffing box for a well rod comprising an elongated body formed with a lubricant reservoir at its upper end, said body having a longitudinally extending bore therein, the upper portion of which is enlarged and opens out into the reservoir, gaskets located in the enlarged part of the bore, the upper end of the reservoir having an opening therein of larger diameter than the enlarged part of the bore permitting gaskets to be placed into said enlarged part of the bore, a plug for closing the opening and said plug having a threaded opening passing therethrough, an elongated tubular member having its bore of the same diameter throughout, the well rod passing through said member and through the gaskets and through the lower part of the bore of the body, the tubular member passing through the threaded hole in the plug and having a part passing through the reservoir, said part having perforations therein, the lower end of the tubular member being enlarged and entering the top part of the enlarged part of the bore for engaging the top gasket, the upper portion of the tubular member projecting above the plug, means providing for the turning of the tubular member in the plug to raise and lower the said tubular member and a packing gland at the upper end of the tubular member and through which the rod passes.

HARLEY LEONARD MITCHELL.